(12) United States Patent
Pein

(10) Patent No.: US 8,175,941 B2
(45) Date of Patent: May 8, 2012

(54) METHOD AND SYSTEM FOR DEVELOPING AND APPLYING MARKET DATA SCENARIOS

(75) Inventor: Howard Barry Pein, Harrison, NY (US)

(73) Assignee: Codestreet, LLC, New York, NY (US)

( * ) Notice: Subject to any disclaimer, the term of this patent is extended or adjusted under 35 U.S.C. 154(b) by 986 days.

(21) Appl. No.: 11/942,372

(22) Filed: Nov. 19, 2007

(65) Prior Publication Data

US 2009/0132335 A1 May 21, 2009

(51) Int. Cl.
*G06Q 40/00* (2012.01)

(52) U.S. Cl. .............. 705/35; 705/36 R; 705/37; 705/20

(58) Field of Classification Search .................. 705/10, 705/35–37, 20
See application file for complete search history.

(56) References Cited

U.S. PATENT DOCUMENTS

| | | | | |
|---|---|---|---|---|
| 4,012,132 A * | 3/1977 | Lazarus | ........................... | 353/25 |
| 4,745,559 A * | 5/1988 | Willis et al. | ...................... | 705/37 |
| 5,045,848 A * | 9/1991 | Fascenda | ....................... | 340/4.5 |
| 5,412,416 A * | 5/1995 | Nemirofsky | .................... | 725/36 |
| 5,617,513 A * | 4/1997 | Schnitta | ........................... | 706/14 |
| 5,689,651 A * | 11/1997 | Lozman | ........................... | 705/37 |
| 5,761,442 A * | 6/1998 | Barr et al. | .................... | 705/36 R |
| 5,774,878 A * | 6/1998 | Marshall | ...................... | 705/36 R |
| 5,774,880 A * | 6/1998 | Ginsberg | .................... | 705/36 R |
| 5,857,176 A * | 1/1999 | Ginsberg | .................... | 705/36 R |
| 5,862,325 A * | 1/1999 | Reed et al. | ..................... | 709/201 |
| 5,864,827 A * | 1/1999 | Wilson | ............................. | 705/35 |
| 5,873,069 A * | 2/1999 | Reuhl et al. | ...................... | 705/20 |
| 5,893,079 A * | 4/1999 | Cwenar | ........................ | 705/36 R |
| 5,946,667 A * | 8/1999 | Tull et al. | ...................... | 705/36 R |
| 5,987,432 A * | 11/1999 | Zusman et al. | .................. | 705/35 |
| 6,345,288 B1 * | 2/2002 | Reed et al. | ...................... | 709/201 |
| 6,655,112 B1 | 12/2003 | Cremer et al. | | |
| 6,829,534 B2 * | 12/2004 | Fuchs et al. | .................... | 701/213 |
| 6,939,137 B1 | 9/2005 | Colaio et al. | | |
| 7,742,959 B2 * | 6/2010 | Muller | ............................. | 705/35 |
| 7,865,426 B2 * | 1/2011 | Volpert | ........................... | 705/37 |
| 7,904,363 B2 * | 3/2011 | Wu | ................................. | 705/35 |
| 7,908,202 B2 * | 3/2011 | Graff | .............................. | 705/37 |
| 2003/0154025 A1 * | 8/2003 | Fuchs et al. | .................... | 701/213 |
| 2003/0195822 A1 | 10/2003 | Tatge et al. | | |
| 2004/0243502 A1 | 12/2004 | Slowik et al. | | |
| 2004/0254876 A1 | 12/2004 | Coval et al. | | |
| 2005/0233286 A1 | 10/2005 | Colaio et al. | | |
| 2007/0156574 A1 | 7/2007 | Marynowski et al. | | |

* cited by examiner

*Primary Examiner* — Narayanswamy Subramanian
(74) *Attorney, Agent, or Firm* — Thompson Hine L.L.P.

(57) ABSTRACT

A method and system for developing and applying market data scenarios in which market data is received from a market data distribution platform, stored, changed with respect to a specific asset included in the market data and the altered market data transmitted to a client application that processes the altered market data as if it were transmitted directly from the platform. The system may include a recording module for receiving a stream of market data from the platform, an interface module for specifying changes to the replayed stream to form a stream of altered market data and a client application interface for transmitting a stream of altered market data to a client application. The stream of altered market data mimics the market data stream such that the stream of altered market data can be processed as if it were market data from the market data distribution platform.

21 Claims, 5 Drawing Sheets

```
○ Edit Transformation                                                      ⊠
Select Transformation or Groovy Script:
┌─────────────────────────────┬──────────────────────────────────────────────┐
│ Find            ▽  △        │ <script>-<! [CDATA]                          │
├─────────────────────────────┤ // Adds 2 percent to the BID price, keeping the original spread
│ ⊞ ▭ XML Mapping             │ if( rec.BID && rec.ASK ) {                   │
│ ⊟ ▭ Groovy Scripting        │   spread = rec.ASK–rec.BID  // 1 only if the record contains BID
│   ⊞ ▭ Foreign Exchange   90 │   rec.BID=rec.BID*1.02      // compute the spread
│   ⊞ ▭ Fixed Income          │   rec.ASK=rec.BID+spread    // add 2 percent to the BID
│   ⊟ ▭ Equities              │ }                            // 1 adjust ASK
│     ─• add 2 percent to BID/ASK │                                          │
│     ─• script template      │ ] ></script>                      92         │
│     ─• script template with static initialization                          │
│ ⊞ ▭ Saved Transformations   │                                              │
└─────────────────────────────┴──────────────────────────────────────────────┘
                              [ Add Transformation ] [ Undo ]   [ Load Transformation ]
<script>-<! [CDATA]                    98       100                    96
// Adds 2 percent to the BID price, keeping the original spread
if( rec.BID && rec.ASK ) {                          94
   spread = rec.ASK–rec.BID   // 1 only if the record contains BID
   rec.BID=rec.BID*1.02       // compute the spread
   rec.ASK=rec.BID+spread     // add 2 percent to the BID
}                             // 1 adjust ASK
]] ></script>
                                                                      102
88─╱
Input Sample: 5 records, 31 fields    Sample Size: [ 5 ]▽
│ subject          │ time                    │ ASK   │ ASKSIZE │ BID    │ BIDSIZE │ TRDPRC_1 │ TRDVOL_1 │
│ IDN_RDF.ANY.MRVL.O │ 2007-08-27T14:35:28.505 │ 15.33 │ 76      │ 15.32  │ 130     │          │          │
│ IDN_RDF.ANY.INTC.O │ 2007-08-27T14:35:29.044 │       │         │        │         │ 24.63    │ 400      │
│ IDN_RDF.ANY.MSFT.O │ 2007-08-27T14:35:29.045 │ 28.55 │ 286     │ 28.54  │ 60      │          │          │
│ IDN_RDF.ANY.INTC.O │ 2007-08-27T14:35:29.045 │       │         │        │         │ 24.63    │ 1500     │
│ IDN_RDF.ANY.INTC.0 │ 2007-08-27T14:35:29.046 │ 24.64 │ 319     │ 24.63  │ 483     │          │          │

Transformed: 5 records, 31 fields      ✓ Data check: ok           104
│ subject          │ time                    │ ASK    │ ASKSIZE │ BID     │ BIDSIZE │ TRDPRC_1 │ TRDVOL_1 │
│ IDN_RDF.ANY.MRVL.O │ 2007-08-27T14:35:28.505 │ 15.6364│ 76      │ 15.6264 │ 130     │          │          │
│ IDN_RDF.ANY.INTC.O │ 2007-08-27T14:35:29.044 │        │         │         │         │ 24.63    │ 400      │
│ IDN_RDF.ANY.MSFT.O │ 2007-08-27T14:35:29.045 │ 29.1208│ 286     │ 29.1108 │ 60      │          │          │
│ IDN_RDF.ANY.INTC.O │ 2007-08-27T14:35:29.045 │        │         │         │         │ 24.63    │ 1500     │
│ IDN_RDF.ANY.INTC.0 │ 2007-08-27T14:35:29.046 │ 25.1326│ 319     │ 25.1226 │ 483     │          │          │

[ Save ] [ Cancel ]
                                                               106      108
```

FIG. 3

METHOD AND SYSTEM FOR DEVELOPING AND APPLYING MARKET DATA SCENARIOS

BACKGROUND

The disclosure relates to systems and methods for working with real-time, streaming data, and more particularly to systems and methods for manipulating real-time, streaming market data to create artificial market data scenarios.

There is an increasing need to process real-time market data electronically for multiple purposes, such as, for example, determining prices of securities, placing orders for the purchase or sale of securities automatically and for measuring risk within a portfolio of securities. Typically, such software applications receive market data from a commercially available market data service and produce a variety of outputs based on the incoming market data scenario. The purposes of this market data processing software can be wide ranging and the software potentially can react to a wide range of market data scenarios, such as a change in a treasury bill yield curve or a change in a relationship between the prices of two securities.

A problem inherent with the development of such market data processing software applications is that it is difficult to verify in advance of actual use of the software application that the application will react appropriately in response to a detected market condition. Currently, the only way to test the performance of such market data processing software is to wait for the desired market condition to occur, and then observe the behavior of the software in response to it.

SUMMARY

The disclosed method and system enables the automated build and test of market data processing software applications by providing precise market data scenarios that may be applied to the market data processing applications as a test with an expected, precise result that can be monitored for pass or failure. By providing automated market data scenarios to securities trading applications, the testing of the accuracy and reliability of such market data processing applications is simplified.

In one aspect, the disclosed method and system simulates the output of a market data platform or service by changing the data content received from a commercially available market data service to incorporate contrived market scenarios. The changed market data may then be transmitted to a client application and the client application may process the changed market data as if it were actual market data transmitted directly from a market data distribution platform. The method provides asset-specific transformations of the data, so that specific transformations may be employed by a user, or a user may create his or her own transformations of data.

In a preferred embodiment, the method may include the steps of receiving market data from a market data distribution platform, storing the received market data, replaying the stored market data and changing the stored market data with respect to at least one specific field included in the market data by applying in an automated manner a market activity scenario to the stored market data. This modification may include entering parameters directed to the specific field, whereby the value of the specific field is changed from that in the stored received market data. After having been altered in this fashion, the altered market data then may be transmitted to a client application. With this embodiment, it is possible to apply specific market scenarios, and thereby test trading and other market data consuming applications, in off hours when the market being studied is closed.

The aforementioned method may be accomplished by the disclosed system, which may include a recording module for receiving a stream of market data over a network from a market data distribution platform, a user interface module that enables a user to specify changes to the market data stream to form a stream of altered market data and a client application interface for transmitting the stream of altered market data to a client application, whereby the stream of altered market data mimics the market data stream from the market data distribution platform. The client application may process the stream of altered market data as if it were market data from the market data distribution platform. In a preferred embodiment, the system may include a data store for storing market data, market data altered by the system and specific market data altering scenarios.

BRIEF DESCRIPTION OF THE DRAWINGS

FIG. 3 is a screen shot showing a transformation panel that is part of the graphical user interface of the market data simulator of FIG. 1;

DETAILED DESCRIPTION

Figure 1:
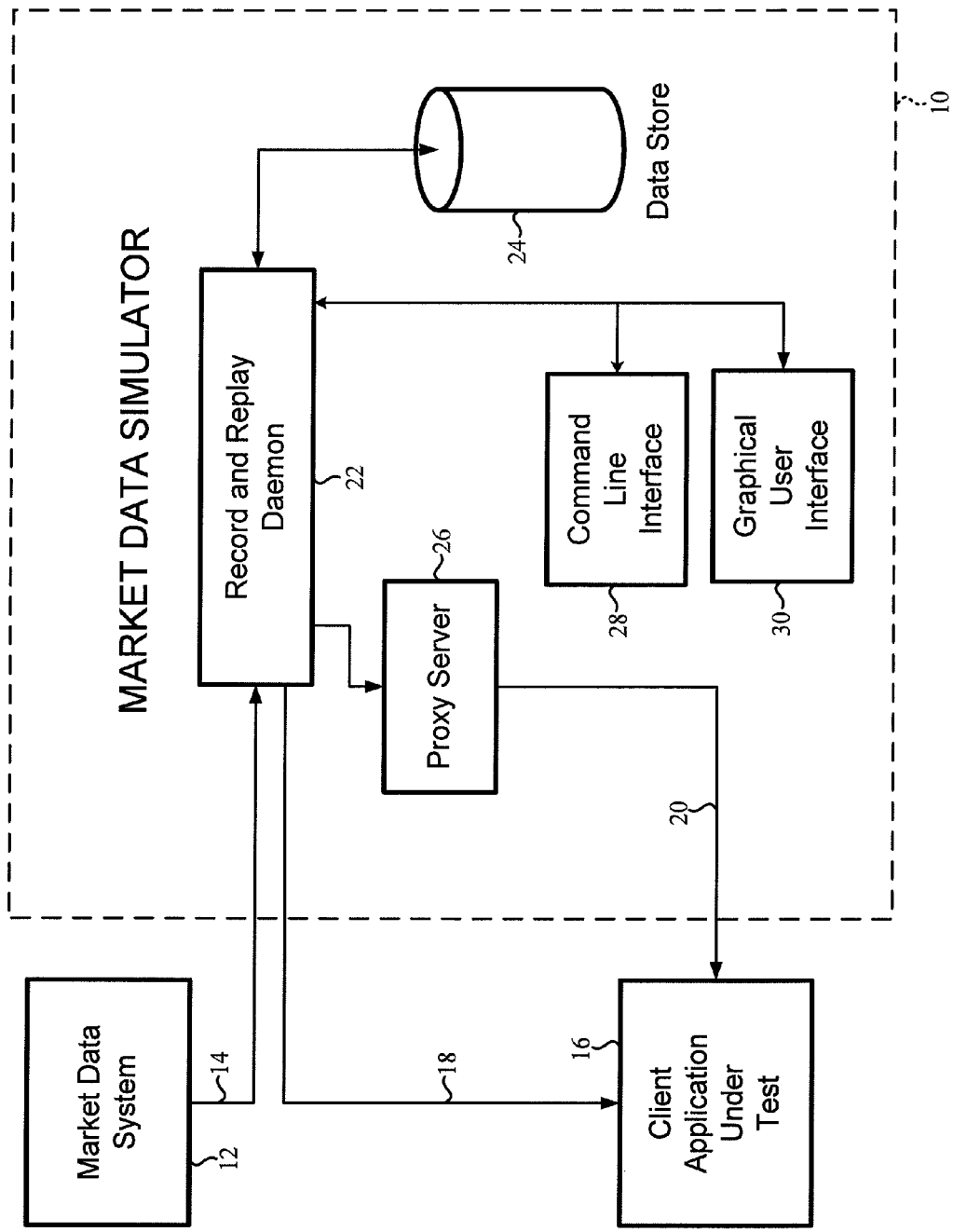
FIG. 1 is a schematic diagram of the disclosed system for developing and applying market data scenarios.

As shown in FIG. 1, the market data simulator, generally designated 10, in a preferred embodiment provides an environment for building, testing, evaluating, demonstrating and analyzing software systems that consume real-time market data. The simulator 10 may receive a stream of market data in real time from a market data system 12, preferably a commercially available market data service, over a network 14, such as the internet. The simulator 10 may modify or change the market data received from the market data system 12 and may transmit the changed data to a client application under test 16 over networks 18 or 20.

The market data simulator 10 may include a record and replay daemon 22, a data store 24, proxy server 26, command line interface 28 and graphical user interface 30. The command line interface 28 and graphical user interface 30 may be connected to pass command messages to the record and replay daemon 22 either to record or replay data received from the market data system 12. The record and replay daemon 22 may, in turn, respond with status messages to the command line interface 28 or graphical user interface 30. The exchange of data between the graphical user interface 30 and command line interface 28, and the record and replay daemon 22, may utilize messaging protocols such as the TIBCO Rendezvous messaging protocol (available from TIBCO Software Inc.). However, other messaging protocols may be used as well.

When either the command line interface 28 or graphical user interface 30 instructs the record and replay daemon 22 to record data, the daemon may begin to record the specified data from the market data system 12 received over network 14. This data may be transferred to and stored in data store 24.

Preferably, data store 24 is a hierarchical directory of flat files with binary encoding that are linked together as a chain of files. These files may be stored within directories, which are in turn stored within directories, allowing for essentially an unlimited amount of data to be recorded, the only limit being the physical data storage capabilities of data store 24.

Once data is stored within data store 24, it may be manipulated by the market data simulator 10 to form arbitrary market data scenarios. This may be accomplished by passing the data from the data store 24 through the record and replay daemon 22 to the graphical user interface 30. The graphical user interface 30 may transform the data appropriately, based upon the request of a user of the simulator 10, and then send the manipulated data back to the record and replay daemon 22 for storage in the data store 24. This contrived scenario of manipulated or changed data may be replayed on demand to the application under test 16.

With this configuration as shown in FIG. 1, the command line interface 28 and graphical user interface 30 are developed as Java applications. The record and replay daemon 22 may be implemented as a C++ server.

The market data simulator 10 may provide data from the record and replay daemon 22 to the application under test 16 through either of two paths, depending on the type of distribution system being emulated by the simulator during playback. For example, if it is desired to use the simulator 10 to simulate a multicast or broadband-based distribution system, then data may flow directly from the record and replay daemon 22 over network 18 to application under test 16. Alternately, if it is desired to use the simulator 10 to simulate a point-to-point distribution platform, then the altered market data may flow from the record and replay daemon 22, through the replay proxy server 26 into the application under test 16 over network 20. It should be noted that it is within the scope of the disclosure to provide the application under test 16 in the same computer system as the simulator 10, thereby eliminating the need for network connections 18, 20.

The application under test 16 thus may be able to perform as if it were subscribing directly to one of the two distribution modes of the market data system 12. Accordingly, the market data simulator 10 may be entirely transparent to the application under test 16. While FIG. 1 shows two different distribution modes, it is within the scope of this disclosure to provide a wide range of distribution components from a variety of vendor distribution platforms without affecting the structure or operation of the simulator 10.

Figure 2:
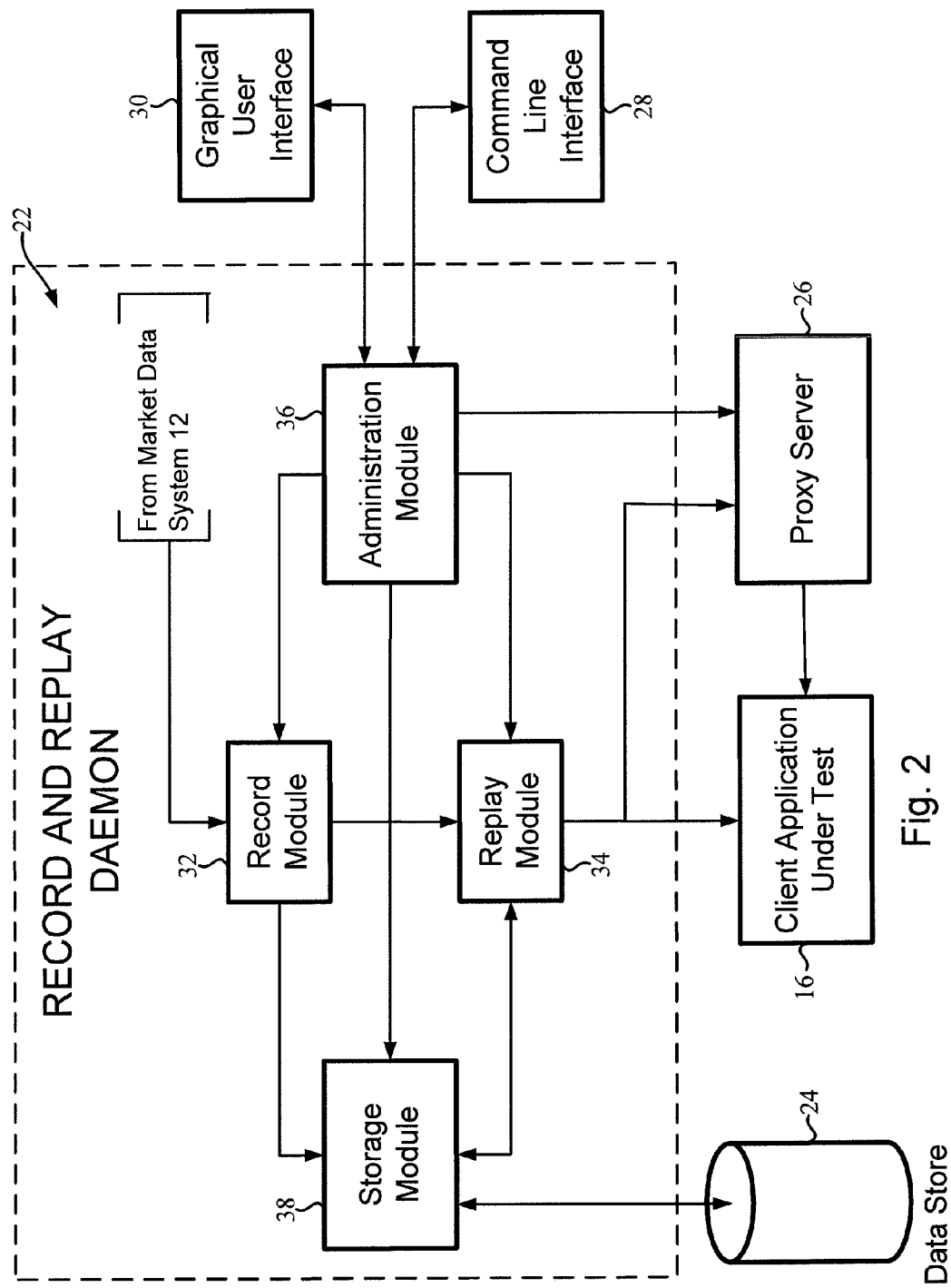
FIG. 2 is a schematic of the record and replay daemon of the schematic diagram of FIG. 1.

As shown in FIG. 2, the record and replay daemon 22 may include subcomponents such as a record module 32, replay module 34, administration module or interface 36, and storage module or interface 38. The administration module 36 may receive commands from graphical user interface 30 or command line interface 28.

The storage module 38 may communicate with data store 24. The storage module 38 may store data in the data store 24 in the form of binary message blobs. The content of messages is extracted and stored along with associated header and index data. Storage module 38 may receive market data from record module 32 and store the market data in data store 24. The storage module 38 also may retrieve modified or altered market data from data store 24.

The record module 32 may record information from the market data system 12. The record module application may be provided a series of symbols to record and the application makes subscription requests for each symbol. The record module 32 may record both update values, which only include fields that have changed, as well as initial value records that are stored periodically in data store 24, so an entire record may be created during a replay. The record module or interface 32 may communicate with a market data distribution platform, such as the market data system 12, for recording data from that platform. In a preferred embodiment, the record module 32 may be built using a market data subscription API (application programming interface) used to subscribe to market data from a market data distribution platform. In such an embodiment, the Reuters or MDS, Triarch and TIB platforms may be supported, but other platforms could be supported as needed.

Replay module 34 may communicate with storage module 38 to retrieve data from data store 24 for modification. Alternately, replay module 34 may receive real-time data from record module 32 that in turn receives the market data from the market data system 12. The replay module 34 is the interface through which market data is replayed. The replay module 34 mimics the semantics of a market data distribution platform, such as market data system 12, so that the client application under test 16 subscribing to the replay module 34 is unable to distinguish between the replay module 34 and the actual market data system 12.

The replay module 34 may use the publication APIs from market data vendors, such as Reuters, to simulate the vendor's market data platform. The replay module 34 may replay, by way of a command line or GUI command received from command line interface 28 or graphical user interface 30, respectively, a previously recorded or created data stream of market data, either from data store 24 or directly from record module 32. By use of the graphical user interface 30 or command line interface 28, a user may specify changes to the replay stream received from data store 24 or record module 32.

Such changes may include accelerating the update rate, pausing and inserting custom updates, injecting error conditions and manipulating the overall update stream through programmatic means. By use of the graphical user interface 30, a user may specify and apply custom functions that manipulate the replayed data in a variety of ways. For example, a user may plot pricing data for a series of bonds, and then adjust the yield for this set of bonds by, in effect, manipulating points along a graph. Manipulating a single point in the graph may then be applied to a range of updates over a period of time. For example, recorded data might include a series of on-the-run United States treasury bonds. By taking a moment in time and reflecting the yield for the latest update for bonds of each maturity along the yield curve, a user may drag and drop or specify directly a change in the yield curve. This, in turn, may lead to a change in all relevant values within relevant updates over a specified interval. Consequently, a user may be able to shift the yield curve over a trading day of recorded market data, and all associated fields for all symbols should be appropriately adjusted.

Similarly, functions may be provided to shift foreign exchange rates, equity prices, options and a wide variety of financial assets for which market data is provided. Once such market data scenarios have been created, the market data scenarios may be stored under a unique name by transmitting the manipulated data from replay module 34 to storage module 38 for storage in data store 24. Such stored scenarios may then be applied against applications in an automated manner, allowing a large regression suite to be developed that can be applied automatically.

When a client application under test 16 attaches to the market data simulator 10 (see FIG. 1) it may retrieve the appropriate initial value snapshot to initialize itself that reflects the relevant moment in time within the replay stream. The client application under test 16 may do so because the system 10 consistently maintains snapshots of the complete market data record at periodical intervals throughout the recording interval in data store 24.

The administration module 36 transmits control messages to start and stop replays and recordings by replay module 34 and record module 32, respectively. Administration requests may be communicated from the graphical user interface 30 or command line interface 28 to the administration module 36. The administration module 36 also may pass the request to the record module 32 and replay module 34. As shown in FIG. 2, the administration module 36 also may transmit requests to the storage module 38, and such requests may include instructions to be transmitted to the data store 24 to purge itself or perform other necessary maintenance operations. In a preferred embodiment, the TIBCO Rendezvous messaging protocol may be used to receive control messages. The administration messages may originate from either the graphical user interface 30, the command line interface 28 or by an administration API (not shown).

The graphical user interface 30 may allow control messages to be sent using the TIBCO Rendezvous protocol to the record and replay daemon 22 (FIG. 1). The record and replay daemon 22 may run on the same hardware as the graphical user interface 30, or in the alternative, it may be run on a physically remote computer system.

The administration module 36 may receive instructions from the graphical user interface 30 or command line interface 28 that it passes to storage module 38 to retrieve previously created altered market data streams, modified in a manner that will be described in greater detail below, stored in data store 24 that are replayed by replay module 34 for transmission to client application under test 16. Alternately, administration module 36 may alter market data streams from market data system 12 by sending the transformation instructions to proxy server 26, so that real-time market data received by proxy server 26 from replay module 34 may be modified by the proxy server and sent to client application under test 16 in real time.

Figure 5:
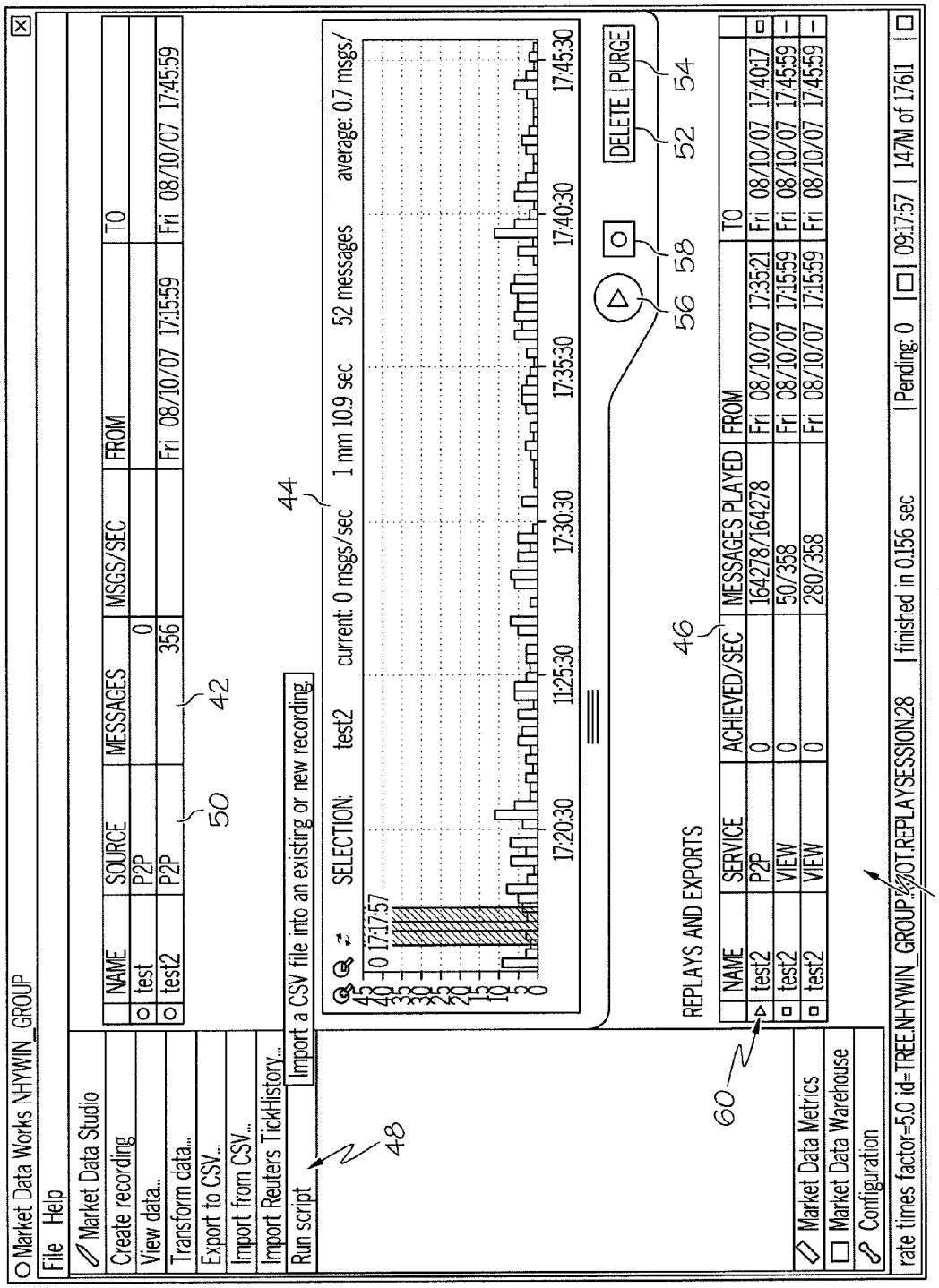
FIG. 5 is a screen shot generated by the graphical user interface of the market data simulator of FIG. 1 showing the main dialog panel.

As shown in FIG. 5, the graphical user interface 30 may include a main dialog screen panel 40. The main dialog panel 40 may include a recording area 42, a graphical area 44 that displays a data stream for transformation or replay, and a replay area 46. The main dialog panel 40 also may include a menu 48 of activities that can be performed with the tool. Preferably, the activities are wizard driven. The recording area 42 displays the recordings, either of data received from market data system 12 or of transformed market data, that have been made by the record module 32 (see FIG. 2) from data received from the market data system 12 and stored in data store 24.

The graphical area 44 shows data rates of the particular recording 50 highlighted in the recording area 42. The graphical area 44 may include a DELETE button 52 and a PURGE button 54. The PURGE button 54 may purge or truncate the oldest portion of a recording shown in window 44, for example, the last three hours of an eight hour recording. The DELETE button 52 may delete an entire recording displayed in window 44. Buttons 56, 58 are provided for starting and stopping replays and recordings, respectively. The graphical area also may enable a user to select periods within a recording for replay or modification.

The lower level 46 of the main dialog panel 40 may display replay sessions. For example, in row 60, the replay session named "test2" was received by way of a point-to-point ("P2P") service. 164,278 messages out of 164,278 messages were played from Friday, Aug. 10, 2007 at 5:35 p.m. and 21 seconds to 5:40 p.m. and 17 seconds.

Figure 4:
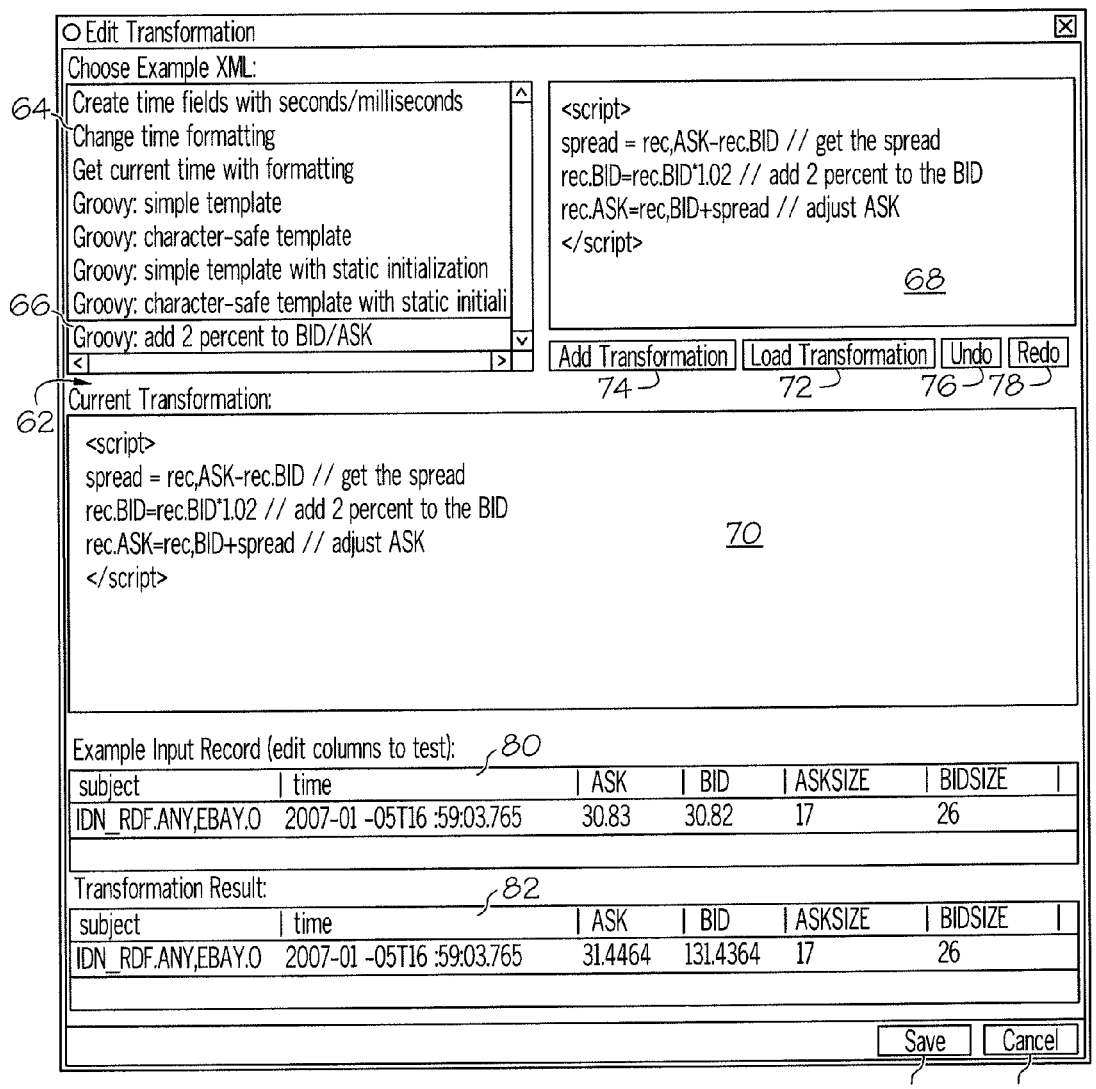
FIG. 4 is a screen shot produced by the graphical user interface of the market data simulator of FIG. 1 in which market data scenarios are contrived.

As shown in FIG. 4, the graphical user interface 30 may include a transformation screen 62 using Groovy language in which market data altering scenarios are contrived. The transformation screen 62 includes a "Choose Example XML" window 64 that displays a list of predetermined and stored scenarios for changing market data. For example, the Groovy script for the scenario 66, highlighted in window 64, named "Groovy: add two percent (2%) BID/ASK" is displayed in window 68. Accordingly, the instructions displayed in window 68 may be transmitted by the graphical user interface 30 (FIG. 2) to the administration module 36, which in turn may transmit the instructions either to replay module 34 or storage module 38.

In addition, a user may create a customized market data modification by typing script instructions in "Current Transformation" window 70. Transformation window 62 also may include a "Load Transformation" button 72, an "Add Example XML" button 74, an "Undo" button 76 and a "Redo" button 78. Preferably, the Load Transformation button 72 adds the selected transformation or change command stored within an external file to window 70. The external file may be stored in data store 24, elsewhere locally or over a network such as the internet. The "Add Example XML" button 74 may allow a selected transformation in window 64, the script of which is displayed in window 68, to be added to window 70, as shown in FIG. 4. The "Undo" and "Redo" buttons 76, 78, respectively, enable a user to undo a transformation or resend a transformation to the administration module 36 and add and remove the transformation from window 70.

Transformation screen 62 also may include a row 80 that displays the example input record of data to be modified and a row 82 that contains data in fields that has been modified by the command in window 70 or 68. As shown in FIG. 4, the transformation added from window 64 and displayed in window 70 has modified the ask price of $30.83 to $31.4464, and the bid price of $30.82 to $31.4364. Both rows 80, 82 display the subject ("IDN_RDF.ANY.EBAY.O") and the time at which the price was taken (2007-01-05T 16:59:03.765). The transformation screen 62 also may include buttons 84, 86 for saving the transformed data in data store 24, or canceling the transformation of the selected data shown in window 70. When saved, a user is asked by GUI 30 to give the transformation a specific name for ease of later recall.

As shown in FIG. 3, a transformation screen 88 using XML language (although it is within the scope of the disclosure to use a variety of different languages) is shown. In transformation screen 88, a window 90 may display a listing of subfolders, each containing files of predetermined transformations or changes of market data received from market data system 12 and transmitted to the graphical user interface 30 through record module 32 and administration module 36 (see FIG. 2). The specific transformation highlighted in window 90 may be set out in window 92. A user may create a transformation by keying in script in edit window 94.

A "Load Transformation" button 96 may be located beneath window 92 and when clicked, may allow a user to load a specific transformation stored in an external file, in a manner similar to the "Load Transformation" button 72 of FIG. 4, and apply that transformation to window 94. A user may select a transformation from window 90, the script of which is displayed in window 92. When clicked, the "Add Transformation" button 98 then adds the transformation highlighted in window 90 to the transformation edit window 94. Changes to a transformation in the transformation edit window 94 may be removed by clicking the "Undo" button 100. Window 102 may display samples of market data received and stored in data store 24. Window 104 may display the individual segments of the data stream that have been transformed and stored in data store 24. "Save" button 106 and "Cancel" button 108 are used to save or cancel a particular transformation definition. The transformations created or added in screens 62, 88 of FIGS. 4 and 3, respectively, are applied to recorded market data using the "Run script" wizard of menu 48 of main dialog panel 40 (FIG. 5).

The main dialog panel 40 in FIG. 5 may be used to perform the following functions: start a replay of stored market data in data store 24, stop a replay of stored market data, fast forward a replay, pause a replay, inject error conditions (i.e., of feed down, stale data and other system errors) in a replay, view recorded data in data store 24, manipulate the recorded data and send the manipulated data interleaved with recorded data to the replay module 34, start a recording by record module 32, stop a recording by the record module and delete a recording stored in data store 24.

The manipulation of recorded data, as mentioned previously, may be accomplished by opening screens 62 or 88 to perform a desired manipulation of market data. In addition, error conditions may be injected by calling market data to a grid, created for example by Excel, modifying the data to include the error condition, and injecting the modified data into the replay stream. Alternatively, the grid may be used to inject script directly into the replay stream.

The command line interface 28 (see FIG. 2) provides a one-for-one equivalent function for each command available in the GUI. This command line interface is provided in the form of a shell window that communicates with the record and replay daemon 22 in the same manner as the graphical user interface 30. As in the case of the graphical user interface 30, the shell sends TIBCO Rendezvous messages to the administration module 36 of the record and replay daemon 22 (see FIG. 2).

The proxy server 26 (see FIG. 1) provides point-to-point transmission of data to a client application under test 16. The proxy server 26 implements the point-to-point semantics of market data platform such as the Reuters Market Data System.

Accordingly, in various embodiments, the disclosed method and system for developing and applying market data scenarios provides the ability to: record market data from a market data distribution platform to form a baseline from which to contrive scenarios, view and chart recorded data, apply functions to recorded data to contrive scenarios, speed up or slow down replay of a recorded scenario, introduce custom updates into a recorded stream, introduce error conditions within a recorded stream, pause, single step and restart a stream, drag and drop a chart of data to form a new scenario, automate application of tests, allow arbitrary modifications of the data stream via programmatic means, store large volumes of recorded data, and mimic a market data distribution platform when replaying market data streams into applications.

What is claimed is:

1. A method for developing and applying market data scenarios comprising:
   receiving by a record and replay daemon executing on a computer system a stream of market data containing values of market items from a market data distribution platform;
   receiving from a user, and separate from said stream of market data, instructions to change values of selected ones of said market items of said stream of market data;
   changing said values of said selected ones of said market items of said stream of market data by said record and replay daemon to inject error conditions in said stream of market data to include values not indicative of actual market data in response thereto to create a stream of changed market data therefrom by applying a market activity scenario created by a user in real time through a graphical user interface, storing said user-created market activity scenario in a data store, entering parameters for a specific asset, whereby update values of said specific asset are changed from values of said specific asset in said stored received market data, including changing a relationship between prices of two equities selected from said stored received market data by introducing a relationship between prices of said two selected equities that varies over time by a predetermined amount, selecting a function from among a plurality of stored functions, each of said stored functions instructing said record and replay daemon to vary a relationship between said two selected equities over time by a predetermined amount; and
   transmitting said stream of changed market data by the record and replay daemon to a client application in a form that mimics the stream of market data received from the market data distribution platform.

2. The method of claim 1 wherein said changing step includes the step of applying in an automated manner modifications to said selected values of said market data, whereby values of said market data are changed to simulate market activity desired by a user.

3. The method of claim 2 wherein said applying step includes the step of applying in an automated manner market activity scenarios selected from a plurality of different, previously stored market activity scenarios.

4. The method of claim 1 wherein the step of changing said selected values includes the step of altering said market data in a manner specific to an asset type included in said market data.

5. The method of claim 1 wherein said relationship introducing step includes the step of introducing a user-created relationship between prices of at least two of a same kind of market items selected from the group consisting of equities, futures, options, bonds and commodities.

6. The method of claim 1 wherein said changing step includes the step of accelerating or decelerating an update rate of said changed market data in said stream of changed market data while maintaining semantics of said stream of market data from said market data distribution platform.

7. The method of claim 1 further comprising the steps of storing said received market data and replaying said stored market data; and said changing step includes the step of changing said stored market data.

8. The method of claim 7 wherein said replaying step includes the step of pausing said replaying of said stored received market data and inserting custom updates in a replay stream of said market data.

9. The method of claim 1 wherein said receiving step includes the step of receiving a stream of market data by said record and replay daemon containing values of market items from a market data distribution platform in real time.

10. The method of claim 9 further comprising the step of storing said stream of market data in a data store.

11. The method of claim 10 wherein said changing step includes the step of changing selected values of said stored stream of market data.

12. The method of claim 11 wherein said changing step includes the step of changing selected values of less than an entire stored stream of market data.

13. A system for developing and applying market data scenarios comprising:
   a computer system;
   a recording module executing on said computer system for receiving a stream of market data containing values of market items over a network from a market data distribution platform;

a graphical user interface operatively connected to said computer system for receiving a market activity scenario from a user;

a data store operatively connected to said computer system for storing said received market data and storing said market activity scenario;

an interface module executing on said computer system for receiving commands from said graphical user interface and injecting error conditions in said stream of market data to make changes to values of selected ones of said market items of said stream of market data to values not indicative of actual market data to form a stream of changed market data therefrom by applying said market activity scenario created by said user in real time through said graphical user interface, storing said user-created market activity scenario in said data store, entering parameters for a specific asset of said stored received market data, whereby update values of said specific asset are changed from values of said specific asset in said stored received market data, including changing a relationship between prices of two equities selected from said stored received market data by introducing a relationship between prices of said two selected equities that varies over time by a predetermined amount, selecting a function from among a plurality of stored functions, each of said functions instructing said recording module to vary a relationship between said two selected equities over time by a predetermined amount in response to instructions provided by a user and separate from said stream of market data; and a client application interface executing on said computer system for transmitting said stream of changed market data to a client application in a form and timing that mimics said market data stream from said market data distribution platform such that said client application can process said stream of changed market data as if it were market data from said market data distribution platform.

14. The system of claim 13 wherein said client application interface includes a replay proxy executing on said computer system that transmits said stream of changed market data to a client application.

15. The system of claim 13 wherein said recording module includes said interface module.

16. The system of claim 13 wherein said graphical user interface includes a command line interface for controlling recording, replay and alteration of said market data to form said changed market data stream.

17. The system of claim 13 further comprising a replay module for replaying market data from said data store in a replay stream wherein said data store includes a plurality of snapshots of a complete market data record at periodic intervals whereby said client application interface transmits said snapshots to client applications.

18. A method for developing and applying market data scenarios comprising:

receiving by a record and replay daemon executing on a computer system a stream of market data containing values of market items from a market data distribution platform;

receiving from a user, and separate from said stream of market data, instructions to change values of selected ones of said market items of said stream of market data;

in response to said instructions, changing said market data by said record and replay daemon to inject error conditions in said stream of market data creating a stream of changed market data from said stream of market data by applying a market activity scenario created by a user in real time through a graphical user interface, storing said user-created market activity scenario in a data store, entering parameters for a specific asset, whereby update values of said specific asset are changed from values of said specific asset in said stored received market data, including changing a relationship between prices of two securities selected from said stored received market data by introducing a relationship between prices of said two selected securities that varies over time by a predetermined amount, selecting a function from among a plurality of stored functions, each of said functions instructing said record and replay daemon to vary a relationship between said two selected securities over time by a predetermined amount; and transmitting said stream of changed market data by the record and replay daemon to a client application in a form that mimics the stream of market data received from the market data distribution platform.

19. The method of claim 18 wherein said parameter entering step includes the step of shifting a yield curve for fixed income securities.

20. The method of claim 18 further comprising a step of providing a plurality of different ones of said contrived market activity scenarios in a data store on said computer; and said changing step includes a step of selecting one of said contrived market activity scenarios from said plurality of contrived market activity scenarios in said data store.

21. A system for developing and applying market data scenarios comprising:

a recording module executing on a computer system for receiving a stream of market data containing values of market items over a network from a market data distribution platform;

a graphical user interface for receiving a market activity scenario from a user;

a data store in communication with said recording module for storing said received market data and storing said market activity scenario;

an interface module executing on said computer system for receiving commands from said graphical user interface and injecting error conditions in said stream of market data to form a stream of changed market data therefrom by applying said market activity scenario created by said user in real time through said graphical user interface, storing said user-created market activity scenario in said data store, entering parameters for a specific asset of said stored received market data, whereby update values of said specific asset are changed from values of said specific asset in said stored received market data, including changing a relationship between prices of two securities selected from said stored received market data by introducing a relationship between prices of said two selected securities that varies over time by a predetermined amount, selecting a function from among a plurality of stored functions, each of said functions instructing said recording module to vary a relationship between said two selected securities over time by a predetermined amount in response to instructions provided by a user and separate from said stream of market data; and a client application interface executing on said computer system for transmitting said stream of changed market data to a client application in a form and timing that mimics said market data stream from said market data distribution platform such that said client application can process said stream of changed market data as if it were market data from said market data distribution platform.

* * * * *